UNITED STATES PATENT OFFICE.

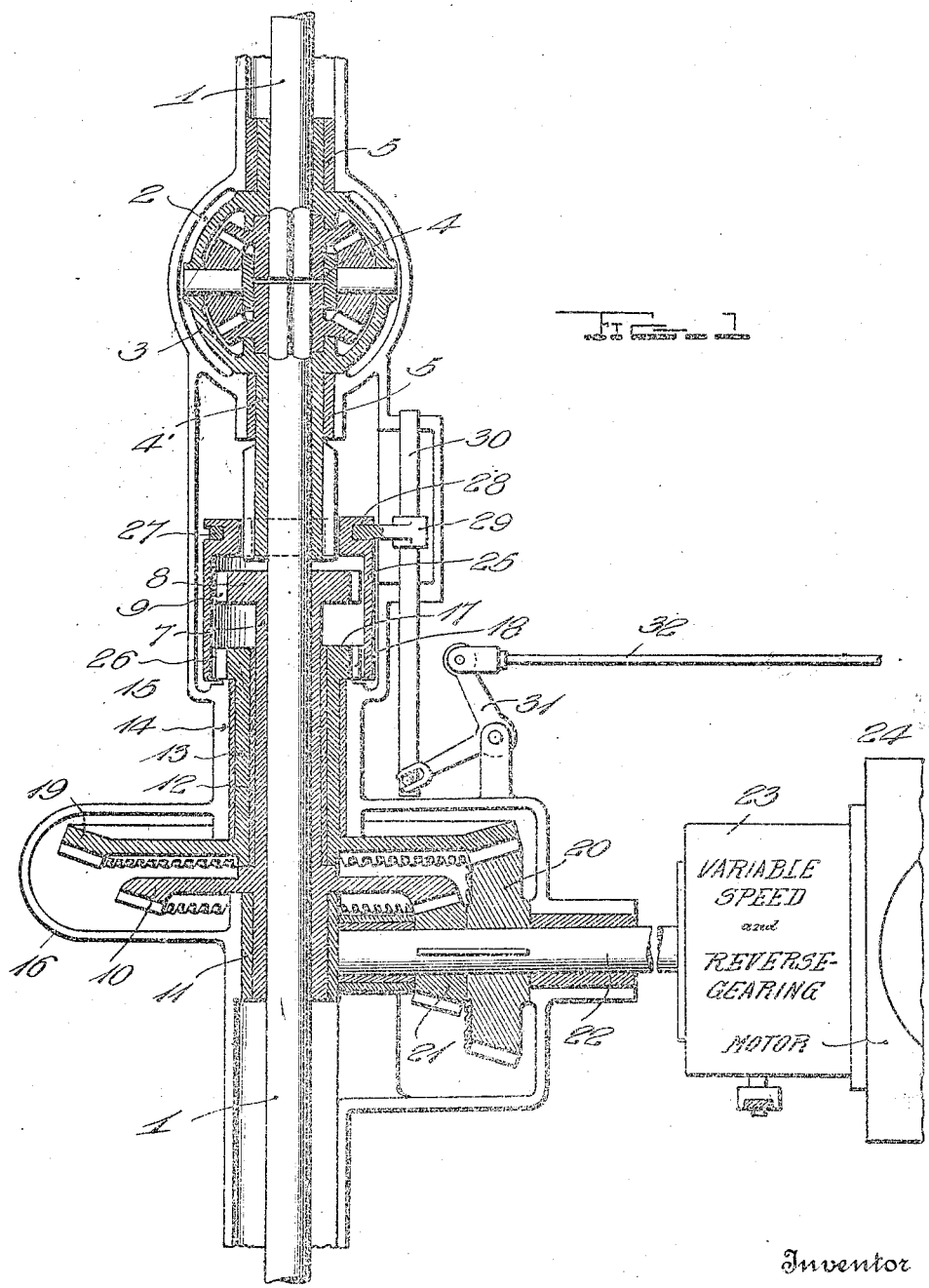

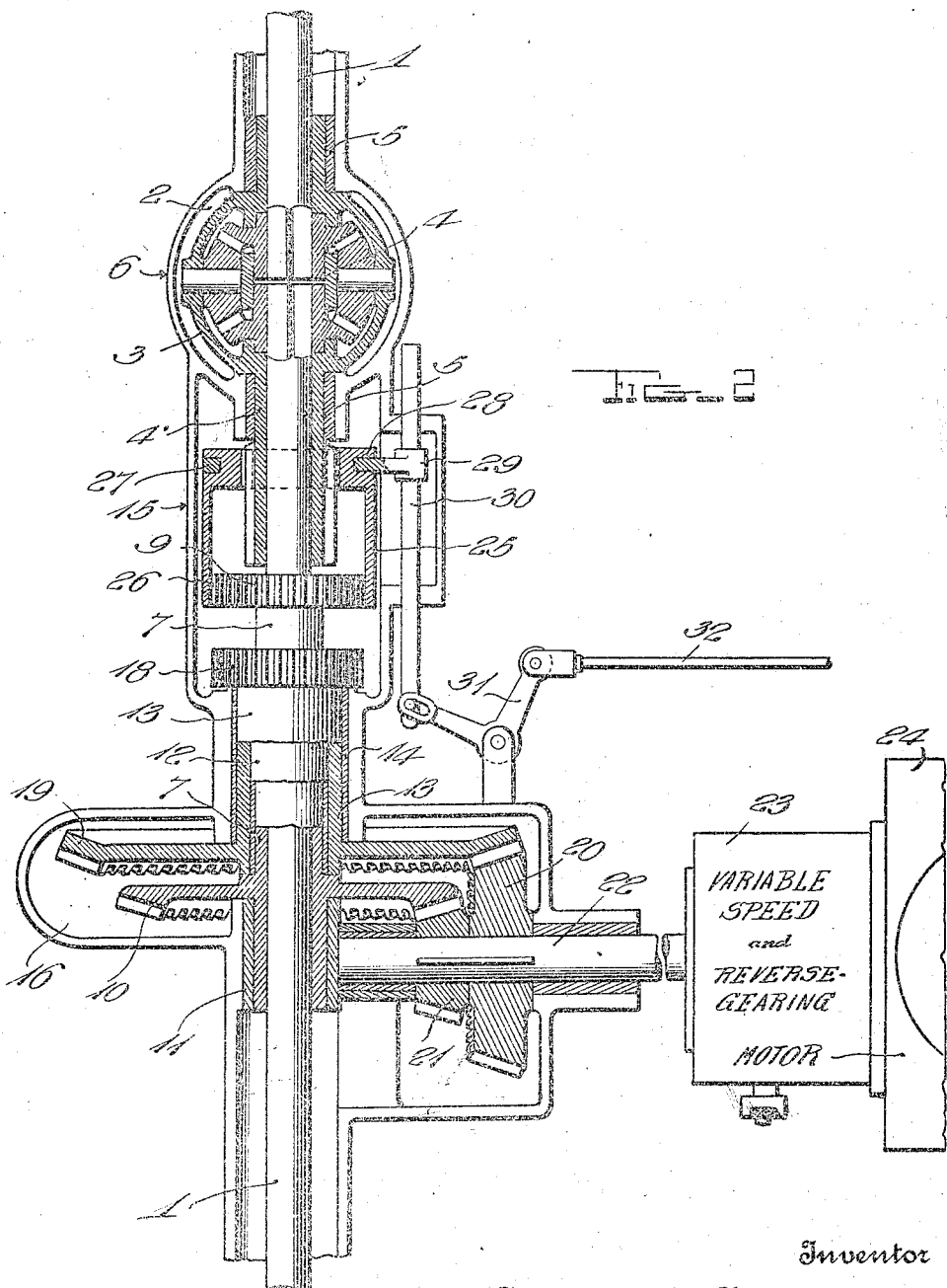

GEORGE IRA GARGETT, OF ALMA, MICHIGAN.

CHANGEABLE-SPEED BEVEL-GEARING.

1,269,531.   Specification of Letters Patent.   Patented June 11, 1918.

Application filed December 17, 1917. Serial No. 207,562.

*To all whom it may concern:*

Be it known that I, GEORGE I. GARGETT, a citizen of the United States, residing at Alma, in the county of Gratiot and State of Michigan, have invented certain new and useful Improvements in Changeable-Speed Bevel-Gearing; and I do declare the following to be a full, clear, and exact description of the invention, such as will enable others skilled in the art to which it appertains to make and use the same.

My invention has for its principal object to provide a simple and compact variable speed transmission to be employed between the usual variable speed and reverse gearing of motor vehicles and the two-part shafts thereof which drive the wheels of the machine, the sections of said shafts either carrying two of the wheels or being operatively connected thereto in any preferred manner, by gears, chains or the like. By the provision of the second set of transmission gears, the operator of the vehicle may take advantage of smooth level stretches and increase the speed of the vehicle without driving the motor above a predetermined speed. Much better results are thus obtained than those derived by driving the motor at an excessive speed, since if the carbureter is set for a certain number of revolutions per minute, any speed above this will result in poor mixing of the air and gas. Furthermore, the ignition system does not operate properly when the motor is driven at a speed above that at which it is intended to travel.

A further object of the invention is to so construct the transmission gearing as to establish substantially a direct drive between the motor and the two-part shaft above referred to, regardless of the adjustment of said gearing for different speeds.

With the foregoing general objects in view, the invention resides in the novel features of construction and unique combinations of parts to be hereinafter fully described and claimed, the descriptive matter being supplemented by the accompanying drawings which form a part of this specification and in which:—

Figure 1 is a horizontal section of the improved transmission set for driving at maximum speed; and Fig. 2 is a similar view showing the relation of parts when driving at a slower rate of speed, but with increased power.

In the drawings above briefly described, the numerals 1 designate the two halves of a shaft whose ends drive the wheels of a motor vehicle. The two sections 1 may either carry the rear wheels of the machine or may be operatively connected therewith, by gears, chains or any other preferred means. Said sections 1 are connected by differential gearing 2 including a rotatable housing 3 having a relatively short hollow hub 4 projecting around one of the sections 1 and a comparatively long hollow hub 4' projecting in the opposite direction and surrounding the other section. Both hubs are suitably mounted in bearings 5 within the differential casing 6.

Rotatably surrounding the shaft section 1 which passes through the elongated hub 4', is a tubular shaft 7 having at one end a head 8 adjacent said hub and provided with external teeth 9. Near its other end, shaft 7 is provided with an integral bevel gear 10 and beyond this gear the shaft is mounted in a suitable bearing 11. A bushing 12 rotatably surrounds shaft 7 and is secured in an outer tubular shaft 13 which is rotatably mounted in a suitable bearing 14 secured in a housing 15 which extends from the differential case 6 to an additional casing 16 within which the gear 11 is located. One end of the shaft 13 is formed with a head 17 spaced from the head 8 and provided with external clutch teeth 18, while a bevel gear 19 of greater diameter than gear 10 is integrally or otherwise joined to the other end of shaft 13. A relatively large pinion 20 meshes with gear 19 and a smaller pinion 21 meshes with gear 10, both of these pinions being carried rigidly on a drive shaft 22 suitably mounted and extending at right angles from the two-part shaft above described. The shaft 22 is driven in any preferred manner but in most cases it will receive its power from the usual transmission 23 which includes variable speed and reverse gearing as well as a clutch, such transmission being suitably operated from the motor 24.

A hollow clutch member 25 is a rotatable bodily with but slidable longitudinally of the hub 4' of the differential housing 3, said member being movable over the heads 8 and 17 and having internal clutch teeth 26 for engagement with the clutch teeth of either of said heads. For shifting member 25 into either operative position or into a neutral position, a collar 27 is mounted in a peripheral groove 28 in the hub of said member, said collar having a lateral arm 29 secured to a sliding shaft 30 which may well be actuated in any preferred manner, a bell crank 31 and a control rod 32 being shown for this purpose.

When clutch member 25 is engaged with head 18 as shown in Fig. 1, the tubular shaft 13 which is driven by the pinion 20 and gear 19, transmits motion to the hub 4' by way of said clutch member. The differential housing 3 is driven by its hub 4' so that the two shaft sections 1 are rotated, maximum speed being obtained by this adjustment of parts. When the clutch member 25 is shifted so that its teeth engage the teeth 9 of head 8, however, the inner tubular shaft 7 will drive said clutch member and the latter will in turn drive the differential housing so that decreased speed with increased power is obtained. This is the normal drive, but whenever a smooth stretch is encountered, the operator may shift into high by moving clutch member 25 into engagement with head 17. Increased vehicle speed may thus be obtained without driving the motor at an excessive rate of speed. Improper running of the motor due to an overworked carbureter or ignition system is thus prevented so that much better results are obtained than if the motor is driven at a speed above that at which it is intended to rotate. Furthermore, fuel is saved.

The improved transmission may be installed as described or in any other preferred manner, at the discretion of the manufacturer, but in all cases it will be highly efficient for the purposes intended. When used in connection with the usual transmission, a greater range of speed is obtained and I prefer in most cases to so employ the invention, but it is to be understood that I am not restricted to such use. Furthermore, the invention is applicable regardless of the manner in which the shaft sections 1 drive the wheels of the machine.

From the foregoing, taken in connection with the accompanying drawings, it will be obvious that although my invention is of extremely simple and inexpensive nature, it will be highly efficient and durable. Since probably the best results are obtained from the several specific details shown and described, these details are preferably employed, but I wish it understood that within the scope of the invention as claimed, numerous minor changes may well be made.

I claim:

1. In a changeable speed gearing for motor vehicles, the combination of a two-part shaft for driving the vehicle wheels, differential gearing connecting the two sections of said shaft and including a rotatable differential housing, a short outer tubular shaft surrounding one section of said two-part shaft in spaced relation thereto, a fixed bearing in which said outer shaft is rotatably mounted, a clutch member on the end of said outer shaft adjacent said differential housing and a gear on the other end of said shaft, an inner relatively long tubular shaft passing rotatably through and projecting from both ends of said outer shaft, a clutch member on the end of said inner shaft, adjacent said first named clutch member and a fixed bearing in which the other end of said inner shaft is rotatably mounted, a gear on said inner shaft, means for driving the gears of the inner and outer shafts at different speeds and a movable clutch member rotatable bodily with said differential housing and coacting with the aforesaid clutch members, to lock either tubular shaft to said housing.

2. In a changeable speed gearing for motor vehicles, the combination of a two-part shaft for driving the vehicle wheels, differential gearing connecting the two sections of said shaft and including a rotatable housing, a pair of tubular shafts disposed one within the other, the inner shaft surrounding one section of said two-part shaft, in spaced relation with said housing, a tubular hub extending from said housing toward said tubular shafts, externally toothed heads on the ends of said tubular shafts adjacent said hub, a hollow clutch member rotatable bodily with and slidable along said hub, said clutch member being movable over said heads, internal teeth on said member for engagement with the teeth of either head, means for shifting said clutch member, and means for driving said tubular shafts at different speeds.

In testimony whereof I have hereunto set my hand in the presence of two subscribing witnesses.

GEORGE IRA GARGETT.

Witnesses:
F. H. ROWLAND,
JOHN P. FRENCH.